US011256339B2

(12) United States Patent
Horvath et al.

(10) Patent No.: US 11,256,339 B2
(45) Date of Patent: Feb. 22, 2022

(54) HEXAGONAL KEYBOARDS WITH MOLDED AXLE SUPPORTS

(71) Applicant: LUMATONE INC., Toronto (CA)

(72) Inventors: Dylan Horvath, Toronto (CA); Charlie Man, Toronto (CA); Aidan Muller, Toronto (CA)

(73) Assignee: LUMATONE INC., Toronto (CA)

( * ) Notice: Subject to any disclaimer, the term of this patent is extended or adjusted under 35 U.S.C. 154(b) by 0 days.

(21) Appl. No.: 17/109,522

(22) Filed: Dec. 2, 2020

(65) Prior Publication Data

US 2021/0216147 A1 Jul. 15, 2021

Related U.S. Application Data

(60) Provisional application No. 62/960,529, filed on Jan. 13, 2020.

(51) Int. Cl.
*G06F 3/02* (2006.01)

(52) U.S. Cl.
CPC ................... *G06F 3/0202* (2013.01)

(58) Field of Classification Search
CPC ........ G06F 3/0202; G06F 3/0216; G10H 1/34
See application file for complete search history.

(56) References Cited

U.S. PATENT DOCUMENTS

| 2001/0052283 | A1* | 12/2001 | Boyer | G10D 13/09 84/443 |
|---|---|---|---|---|
| 2009/0078552 | A1* | 3/2009 | Takemae | H01H 3/125 200/344 |
| 2010/0282581 | A1* | 11/2010 | Lin | G06F 3/0202 200/314 |
| 2011/0148768 | A1* | 6/2011 | Ladouceur | H01H 13/7065 345/169 |
| 2012/0098751 | A1* | 4/2012 | Liu | G06F 3/04886 345/170 |
| 2012/0189368 | A1* | 7/2012 | Jawerth | G06F 3/0231 400/489 |
| 2014/0320411 | A1* | 10/2014 | Kuzmin | G06F 3/04886 345/168 |
| 2015/0370340 | A1* | 12/2015 | Papalia | G06F 1/1664 345/168 |
| 2018/0219553 | A1* | 8/2018 | Casparian | G06F 3/0238 |
| 2019/0235637 | A1* | 8/2019 | Deily | G06F 1/1662 |
| 2020/0110470 | A1* | 4/2020 | Meyers | G06F 3/0202 |

\* cited by examiner

*Primary Examiner* — Amit Chatly
(74) *Attorney, Agent, or Firm* — Perry + Currier Inc.

(57) ABSTRACT

Hexagonal keyboards, key support plates therefor, and methods of manufacture of hexagonal keyboards are described. An example hexagonal keyboard includes a plurality of hexagonal keys and a frame including a key support plate to support the plurality of hexagonal keys. A plurality of axle supports is molded into the key support plate. Each respective axle support of the plurality of axle supports is to pivotally support a respective hexagonal key about a respective hinge. The hexagonal keys are supported in a stepped hexagonal lattice arrangement.

14 Claims, 13 Drawing Sheets

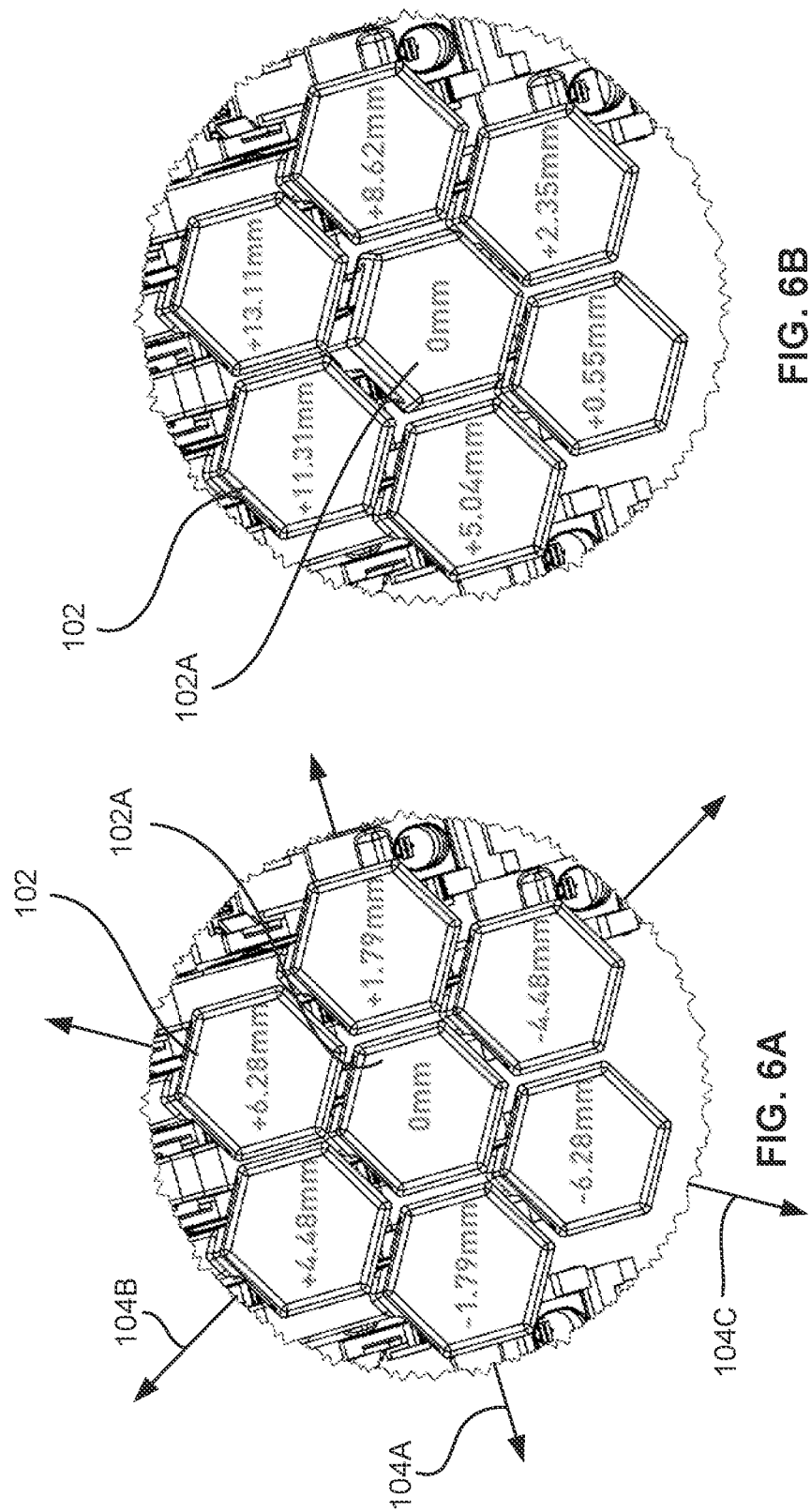

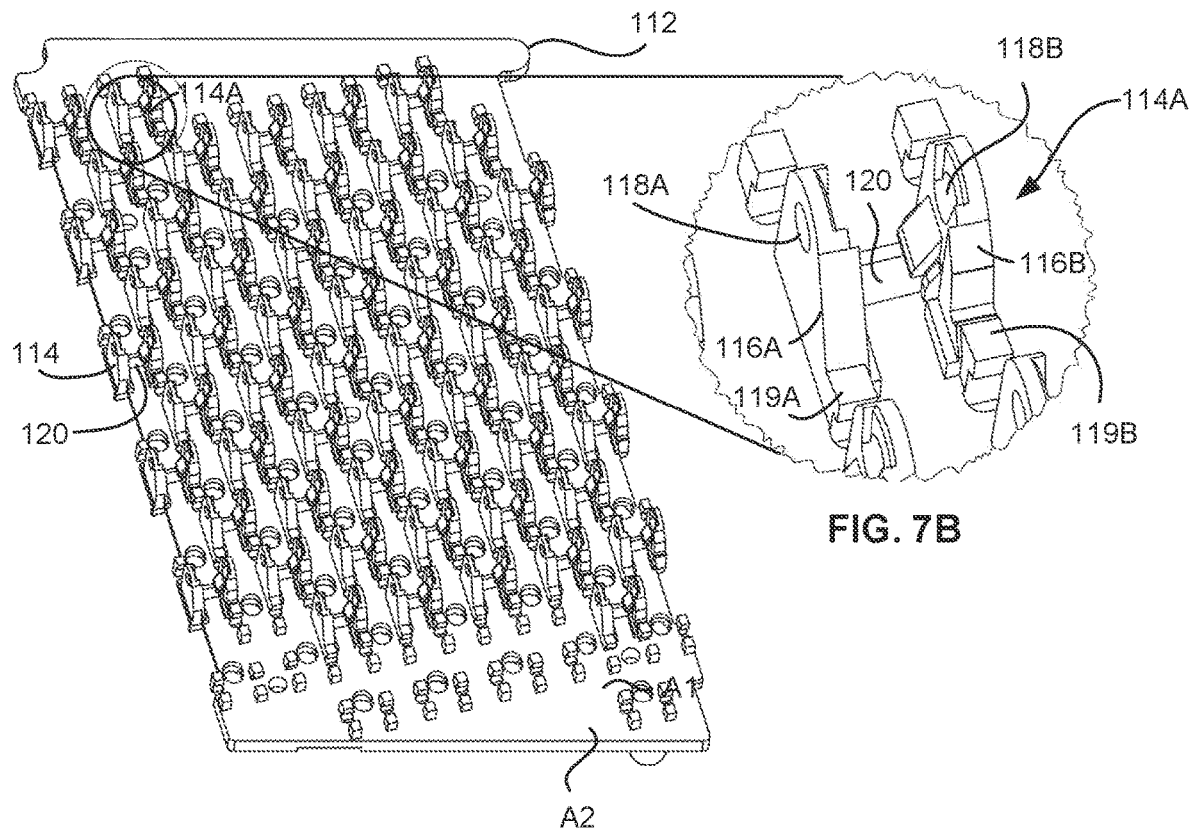
FIG. 7A
FIG. 7B
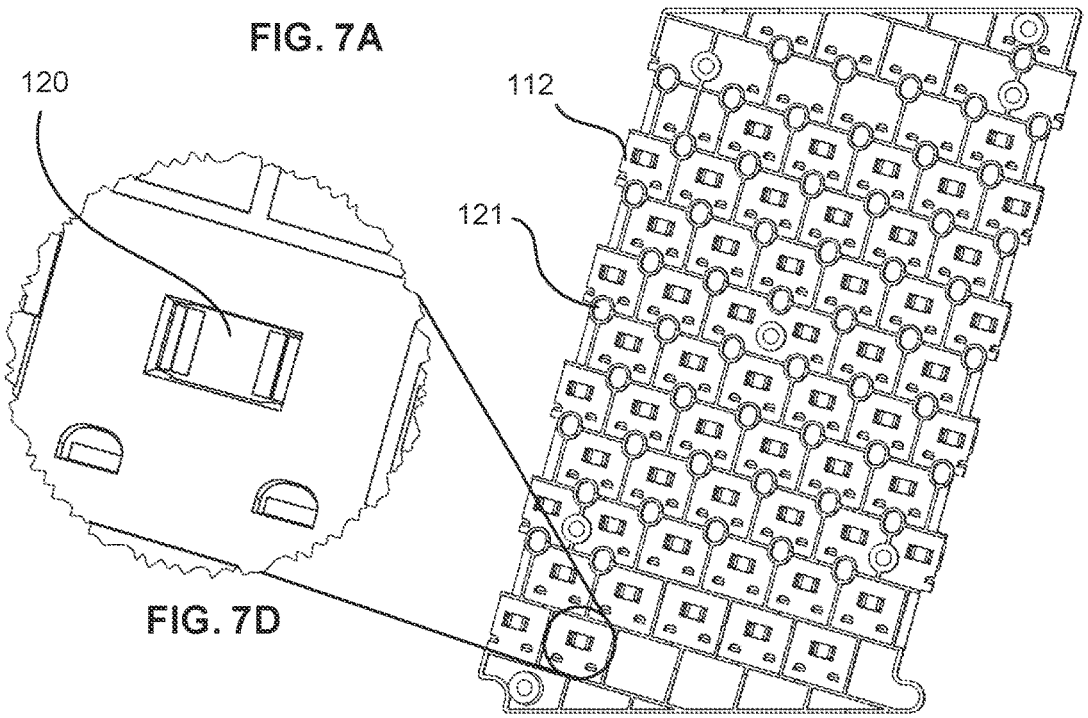
FIG. 7D
FIG. 7C

US 11,256,339 B2

HEXAGONAL KEYBOARDS WITH MOLDED AXLE SUPPORTS

FIELD

The present disclosure relates to keyboards, and in particular to hexagonal keyboards.

BACKGROUND

Hexagonal keyboards feature a number of hexagonal keys arranged in a two-dimensional hexagonal array. Each hexagonal key may be programmed to cause the hexagonal keyboard to produce a particular musical note when pressed. The two-dimensional hexagonal lattice arrangement of the hexagonal keys allows for innovative arrangements of musical notes.

SUMMARY

According to an aspect of the disclosure, a hexagonal keyboard is provided. The hexagonal keyboard includes a plurality of hexagonal keys, a frame including a key support plate to support the plurality of hexagonal keys, and a plurality of axle supports molded into the key support plate. Each respective axle support of the plurality of axle supports is to pivotally support a respective hexagonal key about a respective hinge. The hexagonal keys are supported in a stepped hexagonal lattice arrangement.

According to another aspect of the disclosure, a key support plate to support a plurality of hexagonal keys for a hexagonal keyboard is provided. The key support plate includes a plurality of axle supports molded into the key support plate. Each respective axle support of the plurality of axle supports is to pivotally support a respective hexagonal key about a respective hinge. The hexagonal keys are supported in a stepped hexagonal lattice arrangement.

According to yet another aspect of the disclosure, a method to manufacture a hexagonal keyboard is provided. The method involves molding a key support plate. The key support plate is to support a plurality of hexagonal keys. The molding of the key support plate includes molding a plurality of axle supports into the key support plate. The method further involves assembling the key support plate into a frame for the hexagonal keyboard. The method further involves attaching a plurality of hexagonal keys onto the key support plate. Each respective hexagonal key attaches to a respective axle support of the plurality of axle supports. The hexagonal keys are supported in a stepped hexagonal lattice arrangement.

BRIEF DESCRIPTION OF THE DRAWINGS

FIG. 6A is a top view of the seven neighboring hexagonal keys of FIG. 2A, with the middle hexagonal key in the unpressed state, with example values for height offsets of each of the neighboring hexagonal keys with respect to the middle hexagonal key shown.

FIG. 6B is a top view of the seven neighboring hexagonal keys of FIG. 2B, with the middle hexagonal key in the pressed state, with example values for height offsets of each of the neighboring hexagonal keys with respect to the middle hexagonal key shown.

FIG. 7A is a top view of the key support plate of FIG. 2A.

FIG. 7B is a close-up top view of an example axle support of the key support plate of FIG. 2A.

FIG. 7C is a bottom view of the key support plate of FIG. 2A.

FIG. 7D is a close-up bottom view of a portion of the key support plate of FIG. 2A on the underside of the example axle support of FIG. 7B.

DETAILED DESCRIPTION

Hexagonal keyboards are generally more complex than traditional keyboards. Although a hexagonal keyboard provides for a significantly more customizable keyboard layout, which may be particularly useful in enabling the creative expression of users, the design of a hexagonal keyboard, particularly in the case of hexagonal keyboards that use keys which pivot about a hinge when pressed, presents manufacturing challenges.

First, hexagonal keys are generally supported by some sort of frame. Where the keys pivot about a hinge, the frame may include a great number of axle supports, which may be costly and time-consuming to manufacture and assemble.

Second, the movement of the mechanical parts of the hexagonal keys may be highly constrained. Keys which pivot about a hinge may interfere with the movement of neighboring hexagonal keys, as the arm of the key generally swings at least partly outside of the footprint of the key.

Third, it may be disruptive to a user playing a hexagonal keyboard if, when a key is pressed, that key becomes so the user's finger becomes trapped in a "hole" among neighbouring keys. The likelihood that a user's finger may be trapped in such a hole may be particularly high when the layout of hexagonal keys is flat.

The present disclosure provides a hexagonal keyboard that is simple and of low cost to manufacture, with a design that avoids interference of neighboring hexagonal keys, and that reduces disruptions caused by the formation of holes among neighboring keys. The hexagonal keyboard includes a frame with a key support plate that includes a plurality of axle supports molded directly into the key support plate, thereby simplifying manufacture and reducing costs. The hexagonal keys are supported in a stepped hexagonal lattice arrangement. This arrangement allows space for the movement of mechanical parts when the keys are struck without interfering with neighbouring keys, and further, provides a layout gradually progresses in height across the keyboard to reduce disruption caused by the formation of holes among neighboring keys.

Figure 1:
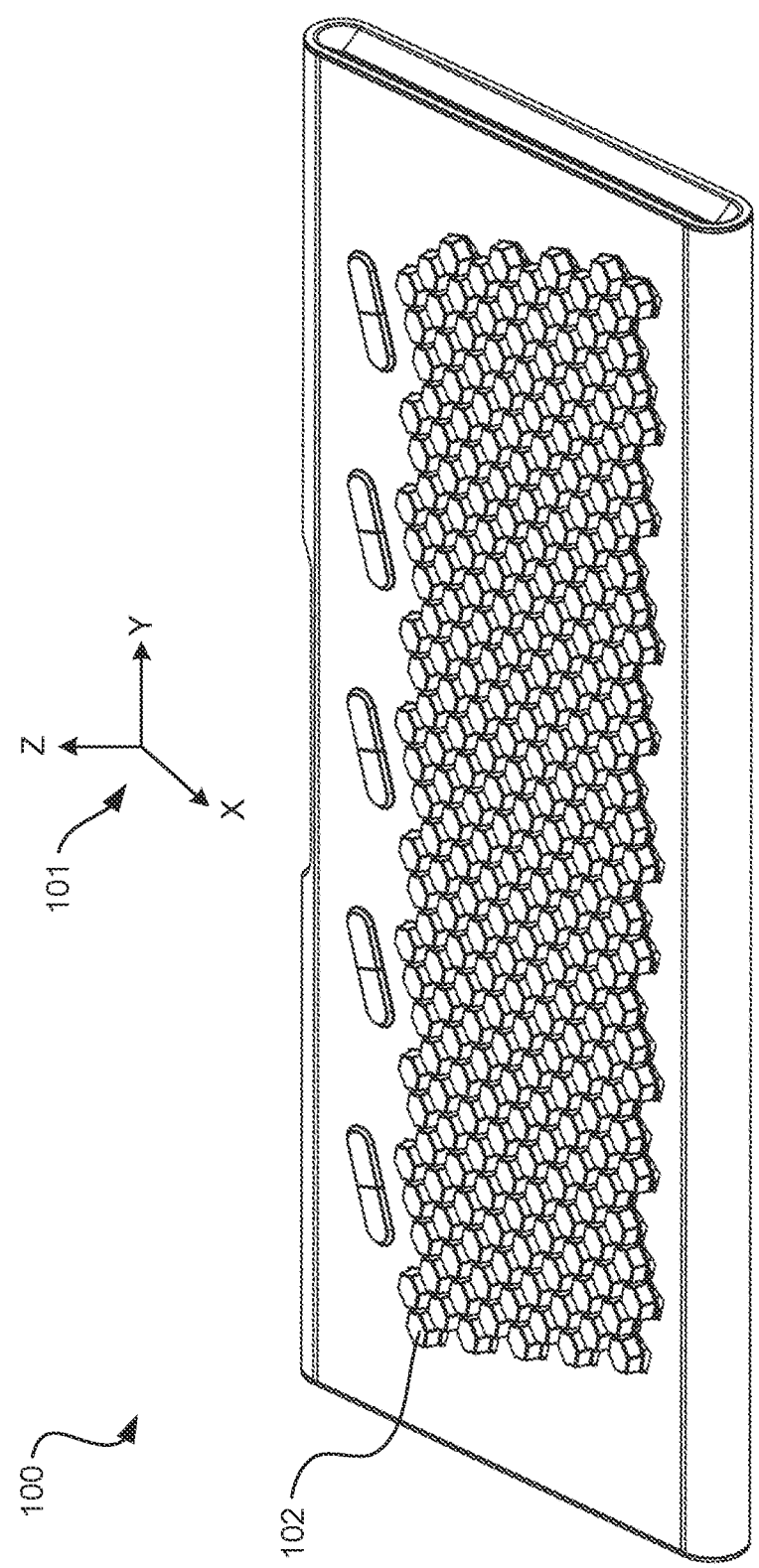
FIG. 1 is an isometric view of an example hexagonal keyboard with key support plates with axle supports molded therein.

FIG. 1 provides an example of such a hexagonal keyboard 100. The hexagonal keyboard 100 includes a plurality of hexagonal keys 102. The hexagonal keys 102 are arranged in a stepped hexagonal lattice. As will be seen below, this arrangement of hexagonal keys 102 allows space for the movement of the hexagonal keys 102 without interfering with neighboring hexagonal keys 102, and reduces disruptions caused by the formation of holes among neighboring hexagonal keys 102 when a given hexagonal key 102 is pressed.

Throughout this disclosure, reference will be made to a reference coordinate system 101, defined by an X, Y, and Z axis. For convenience, the Z axis may be understood to define the vertical axis. The term "up" as used herein is to be understood to generally refer to a direction that is along the positive Z direction, the term "down" is to be understood to generally refer to a direction that is along the negative Z direction, and the term "height" is to refer to a quantity that is generally along the Z axis. Further, the X and y axes may together define a horizontal plane which may be referred to as a "horizontal reference". The horizontal reference may be parallel with a surface (e.g. a table) on which the hexagonal keyboard 100 is to be placed when the hexagonal keyboard 100 is to be used.

Figure 2C:
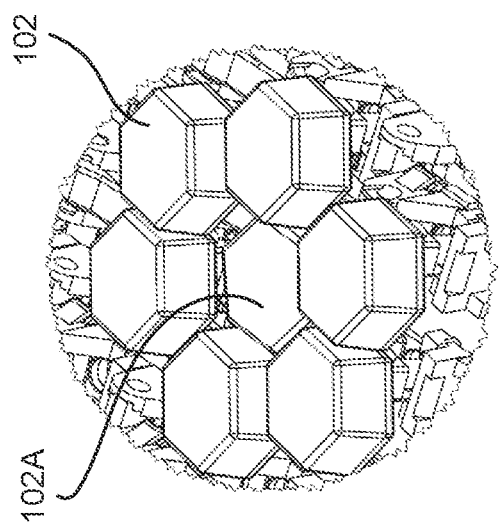
FIG. 2C is a close-up isometric view of the seven neighboring hexagonal keys of FIG. 2B, with the middle hexagonal key in a pressed state.
Figure 2B:
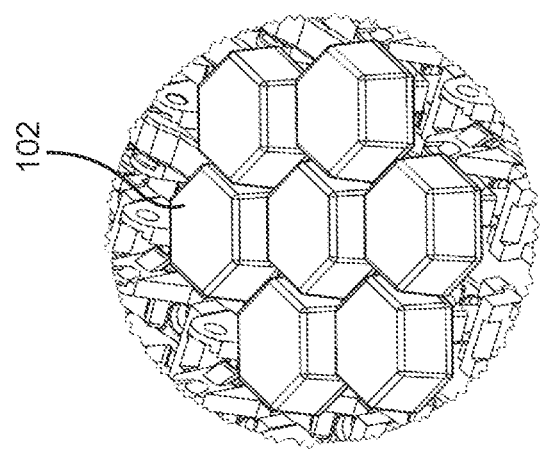
FIG. 2B is a close-up isometric view of the seven neighboring hexagonal keys of FIG. 2A, with a middle hexagonal key in an unpressed state.
Figure 2A:
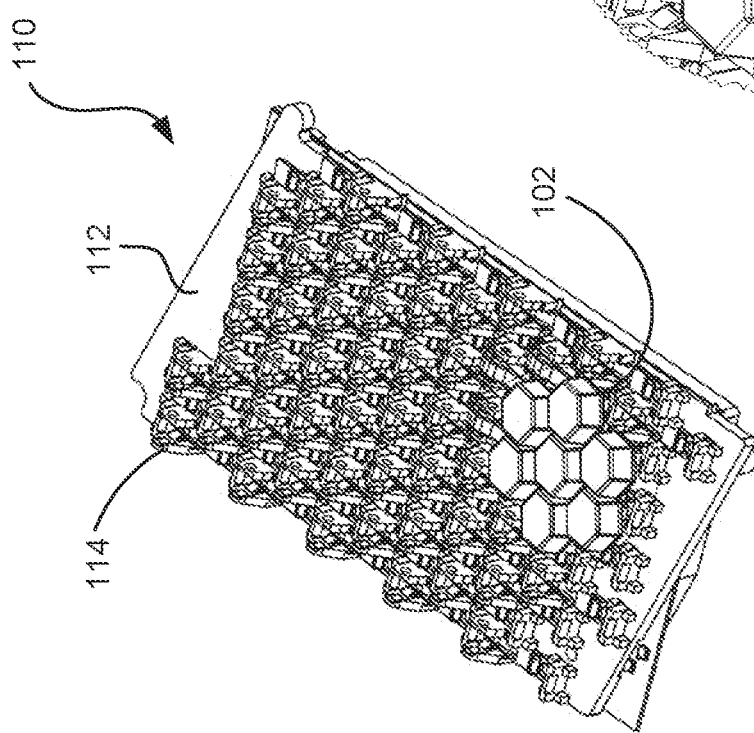
FIG. 2A is an isometric view of an example frame of the hexagonal keyboard of FIG. 1, the frame including an example key support plate with axle supports molded therein to support a plurality of hexagonal keys. An example group of seven neighboring hexagonal keys is shown, with the remaining hexagonal keys omitted to show the axle supports.

The hexagonal keys 102 are supported by a frame 110 that includes a key support plate 112, as seen in FIG. 2A. The key support plate 112 supports the hexagonal keys 102 by a plurality of axle supports 114 that are molded into the key support plate 112. As shown in FIG. 2A, an example group of seven neighboring hexagonal keys 102 is shown, with the remaining hexagonal keys 102 omitted to show the axle supports 114 beneath. Each axle support 114 of the plurality of axle supports 114 pivotally supports a hexagonal key 102 about a hinge, thereby allowing the hexagonal keys 102 to pivot when pressed.

FIG. 2B shows a close-up view of the group of seven hexagonal keys 102 with each of the hexagonal keys 102 in an unpressed state. As shown, the top surface of each of the hexagonal keys 102 in the group is parallel with one another and offset in height from one another. Each of the hexagonal keys 102 being offset in height contributes to the "stepped" quality of the stepped hexagonal lattice arrangement. Thus, the hexagonal keys 102 are not only arranged in a two-dimensional hexagonal lattice arrangement, but also progressively step upward in a third dimension generally from one corner of the hexagonal keyboard 100 to the opposite corner. FIG. 2C shows a close-up view of the same group of seven hexagonal keys 102 with a middle hexagonal key 102A pressed downward into the pressed state. As shown, the middle hexagonal key 102A does not depress strictly vertically, but rather swings downward about its hinge, as described in greater detail below.

Each axle support 114, ora substantial number thereof, may be uniform in design and dimensions. Further, each axle support 114 may be molded directly into the key support plate 112 in a single mold, such as by injection molding, to simplify the manufacture of the key support plate 112. In other words, the key support plate 112 and each respective axle support 114 thereof may be formed in a single mold, such as, for example, by injection molding.

To adopt the hexagonal lattice arrangement, the hexagonal keys 102 may be described as being rotated three times with respect to the reference coordinate system 101, as shown through FIGS. 3A-5B.

Figures 3A, 3B:
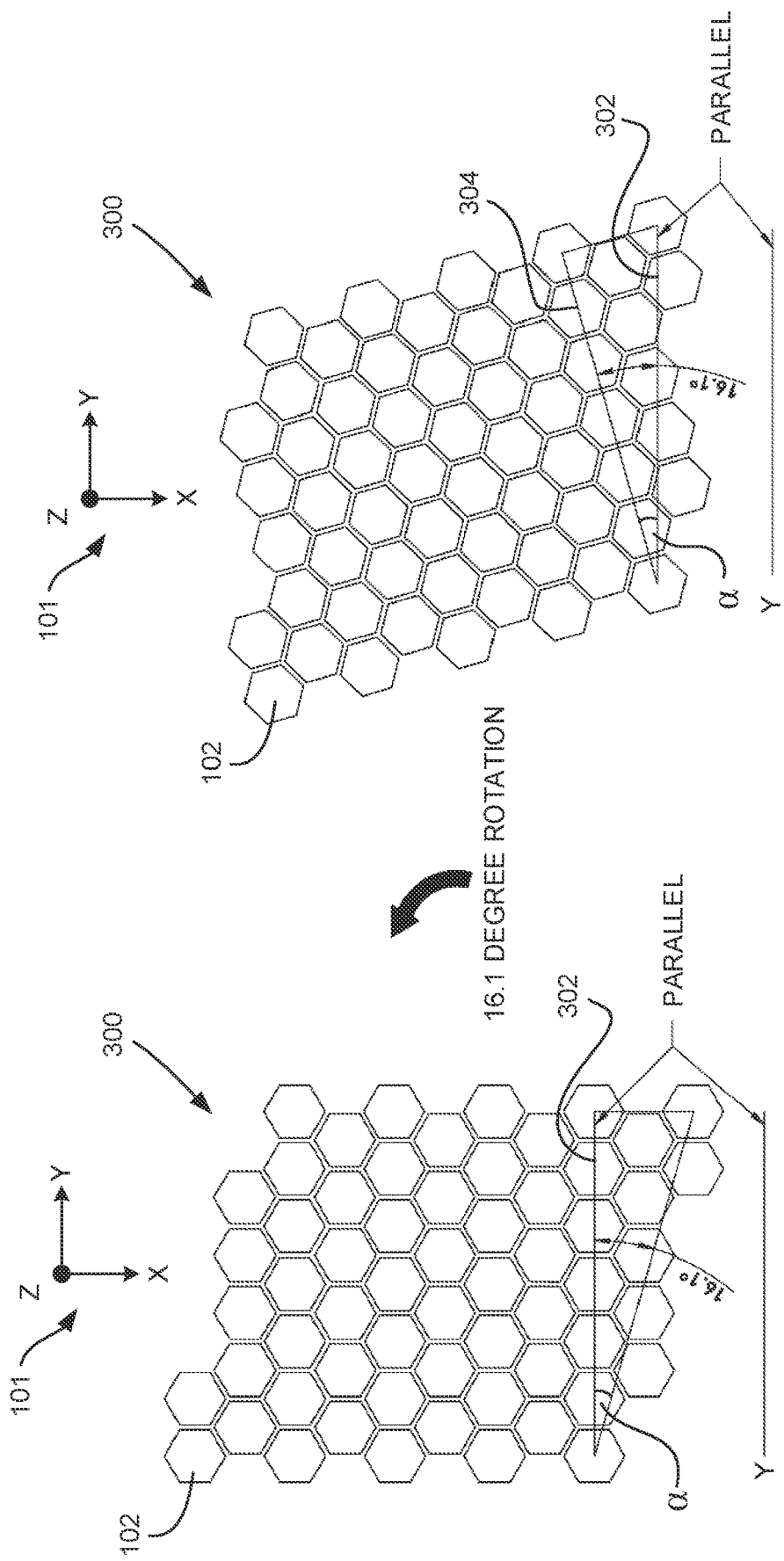
FIG. 3A is a top plan view of an example hexagonal lattice arrangement of hexagonal keys.
FIG. 3B is a top plan view of the hexagonal lattice arrangement of hexagonal keys of FIG. 3A rotated according to a first rotation.

FIG. 3A is a top plan view of a hexagonal array or hexagonal lattice arrangement 300 of hexagonal keys 102. The hexagonal lattice arrangement 300 shows the arrangement of how a plurality of hexagonal keys 102 may be arranged on the axle supports 114 of the key support plate 112 of FIG. 2A, subject to three rotations with respect to the reference coordinate system 101. As shown, rows of hexagonal keys 102 is arranged along a first reference line 302 that is parallel with the Y axis of the reference coordinate system 101. A plurality of rows of hexagonal keys 102 are situated adjacent to one another so that the footprints of the hexagonal keys 102 interlock, or are arranged in a regular lattice structure. FIG. 3B is a top plan view of the hexagonal lattice arrangement 300 rotated by an angle α, equal to about 16.1 degrees counterclockwise about the Z axis of the reference coordinate system 101, in what may be referred to as the "first rotation". As a result, the rows of hexagonal keys 102 are arranged along a second reference line 304 that is angled from the Y axis of the reference coordinate system 101 by about 16.1 degrees. It is emphasized that the value of α (i.e., 16.1 degrees) is shown by way of example only, and it is contemplated that in other hexagonal keyboards 100 the value of α may be any value between, for example, about 5 degrees to about 30 degrees, or other values. The first rotation may be achieved in the hexagonal keyboard 100 by, for example, rotating the key support plate 112 about the Z axis with respect to frame 110 by the angle α, by having each axle support 114 molded into the key support plate 112 rotated by the angle α, or by other means.

Figure 4B:
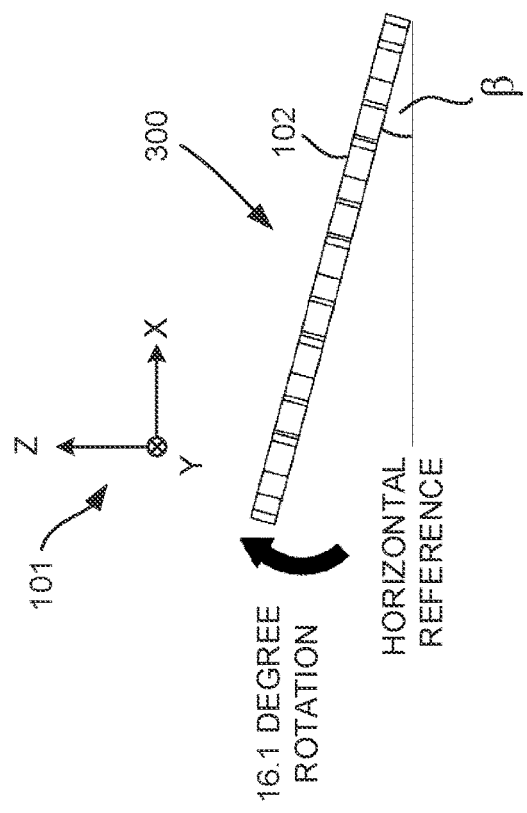
FIG. 4B is a side elevation view of the hexagonal lattice arrangement of hexagonal keys of FIG. 4A having been further rotated by a second rotation.
Figure 4A:
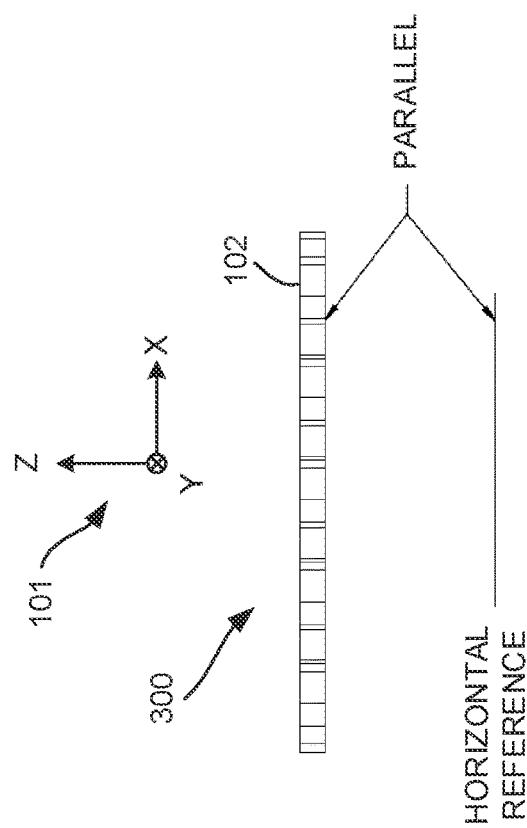
FIG. 4A is a side elevation view of the hexagonal lattice arrangement of hexagonal keys of FIG. 3A having been rotated according to the first rotation.

FIG. 4A is a side elevation view of the hexagonal lattice arrangement 300 of hexagonal keys 102 having been rotated according to the first rotation as described in FIGS. 3A-3B. As shown, the hexagonal lattice arrangement 300 is parallel with the horizontal reference defined by the X and y axes of the reference coordinate system 101. FIG. 4B is a side elevation view of the hexagonal lattice arrangement 300 rotated by an angle β, equal to about 15 degrees clockwise about the Y axis of the reference coordinate system 101, in what may be referred to as the "second rotation". As a result, the hexagonal lattice arrangement 300 angled from, or inclined from, the horizontal reference by about 15 degrees. It is emphasized that the value of β (i.e., 15 degrees) is shown by way of example only, and it is contemplated that in other hexagonal keyboard 100 the value of β may be any value between, for example, about 5 degrees to about 30 degrees, or other values. The second rotation may be achieved in the hexagonal keyboard 100 by, for example, inclining the key support plate 112 from the frame 110, from the body of the hexagonal keyboard 100, or generally, from the horizontal reference. The inclination may be achieved by a structural support (e.g. a stand), by design of the body the hexagonal keyboard 100 (e.g. the body being in a wedge shape having a wedge angle of β).

Figure 5B:
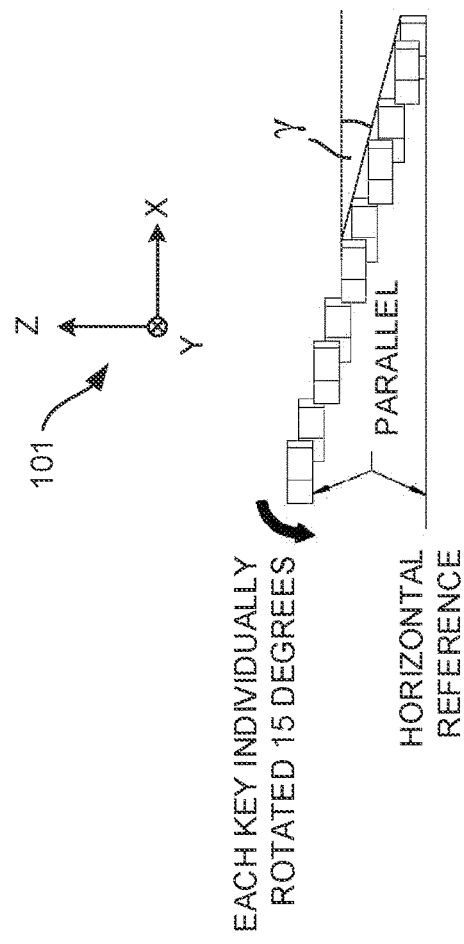
FIG. 5B is a side elevation view of the hexagonal lattice arrangement of hexagonal keys of FIG. 5A wherein each hexagonal key has been further rotated by a third rotation.
Figure 5A:
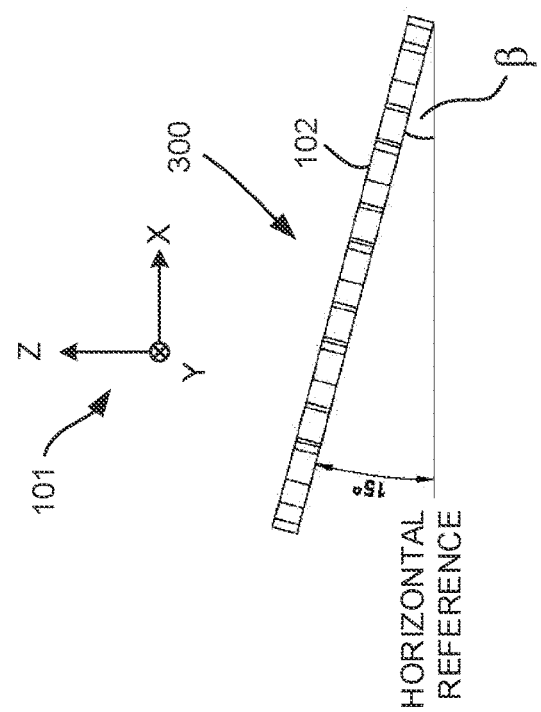
FIG. 5A is a side elevation view of the hexagonal lattice arrangement of hexagonal keys of FIG. 3A having been rotated according to the first rotation and the second rotation.

FIG. 5A is a side elevation view of the hexagonal lattice arrangement 300 of hexagonal keys 102 having been rotated according to the first rotation as described in FIGS. 3A-3B and the second rotation as described in FIGS. 4A-4B. As shown, the hexagonal lattice arrangement 300 is inclined from the horizontal reference by the angle β, equal to about 15 degrees clockwise about the Y axis of the reference coordinate system 101. FIG. 5B is a side elevation view of the hexagonal lattice arrangement 300 in which each of the hexagonal keys 102 is further individually rotated counter-clockwise (opposite the rotational direction of the angle β) by an angle γ, equal to about 15 degrees counterclockwise about the Y axis of the reference coordinate system 101, in what may be referred to as the "third rotation". In the present example, the value of β is equal to the value of γ, and as a result, the top surface of each hexagonal key 102 is parallel with the horizontal reference. In other examples, it is contemplated that the value of γ may be greater or less than the value of β, and thus the top surfaces of the hexagonal keys 102 may not be strictly parallel with the horizontal reference. The third rotation may be achieved in the hexagonal keyboard 100 by the way in which each individual hexagonal key 102 rests on its respective axle support 114, as discussed in greater detail below.

Thus, each hexagonal key 102 is supported in the stepped hexagonal lattice arrangement by the plurality of hexagonal keys 102 being held in a hexagonal lattice arrangement that is rotated by the first angle (α) with respect to a Z axis of the reference coordinate system 101, the plurality of hexagonal keys 102 being inclined by a second angle (β) from a plane defined by the X and y axes of the reference coordinate system 101 (i.e., the horizontal reference), and each hexagonal key 102 being individually rotated by a third angle (γ) with respect to the Z axis of the reference coordinate system in an opposite rotational direction from the first angle.

By subjecting the hexagonal lattice arrangement 300 and the hexagonal keys 102 thereof to these three rotations, the hexagonal keys 102 adopt the stepped hexagonal lattice arrangement. In the stepped hexagonal lattice arrangement shown, each of the hexagonal keys 102 in a group of neighboring hexagonal keys 102 is parallel and offset from the other top surfaces of the other hexagonal keys, and the heights of the hexagonal keys 102 progresses from one corner of the hexagonal keyboard 100 to the opposite corner. This arrangement allows for space for the pivoting movements of the hexagonal keys 102 without interfering from neighboring hexagonal keys 102, and which reduces disruptions caused by the formation of holes among neighboring hexagonal keys 102 when a given hexagonal key 102 is pressed.

As mentioned above, in the example shown, the top surface of each of the hexagonal keys 102 in the group is parallel and offset from the other top surfaces of the other hexagonal keys 102. Example values for these height offsets are shown in FIG. 6A-6B. In FIG. 6A, as in FIG. 2A, a group of seven neighboring hexagonal keys 102 is shown, with the value of the height offset of each hexagonal key 102 relative to a middle hexagonal key 102A shown. Thus, the middle hexagonal key 102A has a height offset of 0 mm, one neighboring hexagonal key 102 is offset from the middle hexagonal key 102A by −1.79 mm, another neighboring hexagonal key 102 is offset from the middle hexagonal key 102A by +1.79 mm, another neighboring hexagonal key 102 is offset from the middle hexagonal key 102A by −4.48 mm, another neighboring hexagonal key 102 is offset from the middle hexagonal key 102A by +4.48 mm, another neighboring hexagonal key 102 is offset from the middle hexagonal key 102A by −6.28 mm, and another neighboring hexagonal key 102 is offset from the middle hexagonal key 102A by +6.28 mm.

This arrangement of height offsets is applicable to any given selection of seven neighboring hexagonal keys 102 in the hexagonal keyboard 100. Thus, the progression of height of the hexagonal keys 102 is regular across the hexagonal keyboard 100 in three directions of height progression 104A, 104B, 104C. Therefore, any hexagonal key 102 that neighbors another hexagonal key 102 along the direction of height progression 104A is offset in height by 1.79 mm. Similarly, any hexagonal key 102 that neighbors another hexagonal key 102 along the direction of height progression 104B is offset in height by 4.48 mm. Similarly, any hexagonal key 102 that neighbors another hexagonal key 102 along the direction of height progression 104C is offset in height by 6.28 mm. This particular progression of height offsets is achieved by the three rotations described above. The three rotations may therefore be selected to achieve a particular design progression of height offsets of the hexagonal keys 102 across the hexagonal keyboard 100, or in other words, to achieve a particular "steepness" in the stepped hexagonal lattice. The three rotations may be used to custom design a hexagonal keyboard 100 to suit the preference of a particular user.

In FIG. 6B, as in FIG. 2B, the same group of seven neighboring hexagonal keys 102 is shown, with the middle hexagonal key 102A in a pressed state. In the pressed state, the neighboring hexagonal keys 102 are offset from the middle hexagonal key 102A by +5.04 mm, +11.31 mm, +13.11 mm, +8.62 mm, +2.35 mm, and +0.55 mm. Thus, in the present example, the middle hexagonal key 102A is depressed by a height of 6.83 mm when in the pressed state.

Notably, although the middle hexagonal key 102A, when in the pressed state, is lower in height than each of its neighboring hexagonal keys 102, the height difference between the middle hexagonal key 102A and at least some of its neighboring hexagonal keys 102 is not as great as the height different would have been had the hexagonal keys 102 not been arranged in the stepped hexagonal lattice. If the hexagonal keys 102 were arranged flat, that is, if the top surface of each hexagonal key 102 were at the same height as one another, then when the middle hexagonal key 102A is pressed, each neighboring hexagonal key 102 would be 6.83 mm higher than the middle hexagonal key 102A—or in other words, the middle hexagonal key 102A would be in a 6.83 mm deep "hole". However, as shown, there are three neighboring hexagonal keys 102 from which the middle hexagonal key 102A is offset by a height that is less than the height by which the middle hexagonal key 102A is depressed. That is, there are neighboring hexagonal keys 102 that are offset from the middle hexagonal key 102A by +5.04 mm, +0.55 mm, and +2.35 mm. Each of these height offsets is smaller than 6.83 mm. This group of three hexagonal keys 102 that remain relatively near in height to the middle hexagonal key 102A reduce disruptions caused by the creation of "holes", as it is easier for the user of the hexagonal keyboard 100 to move their finger from the middle hexagonal key 102A, when depressed, to these keys which are nearer to the middle hexagonal key 102A in height, than it would be for the user to move their finger over keys that are offset from the middle hexagonal key 102A by a greater height.

FIG. 7A is a top view of the key support plate 112. FIG. 7B is a close-up top view of a given axle support 114A. FIG. 7C is a bottom view of the key support plate 112, and FIG. 7D is a close-up bottom view of the portion of the key support plate 112 beneath the axle support 114A.

Figure 12A:
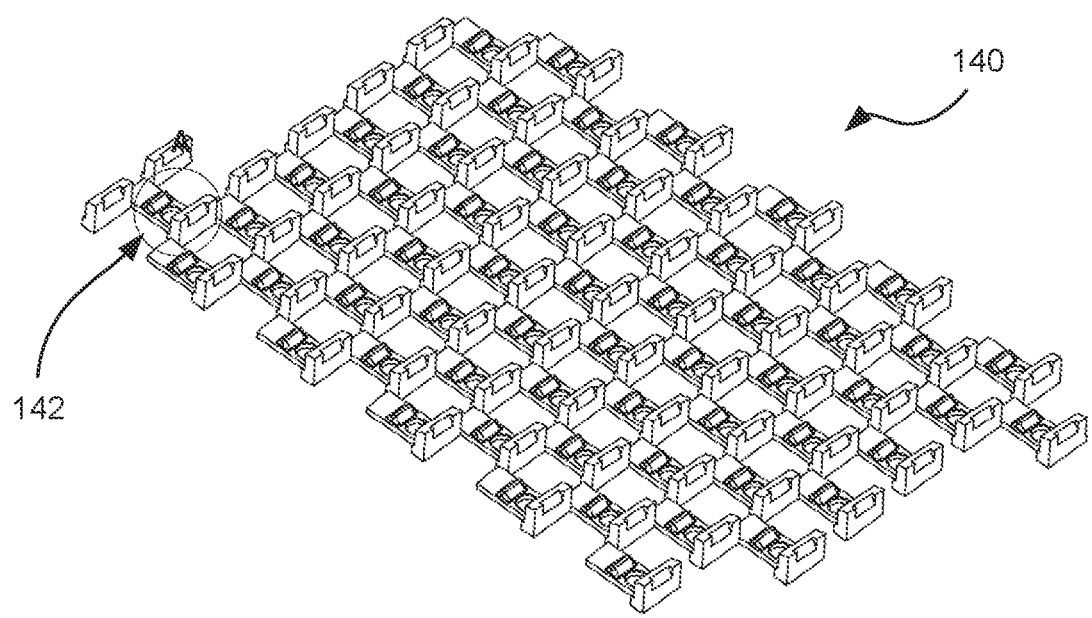
FIG. 12A is a top view of an example damper overlay that is shaped complementary to the key support plate of FIG. 2A.
Figure 12B:
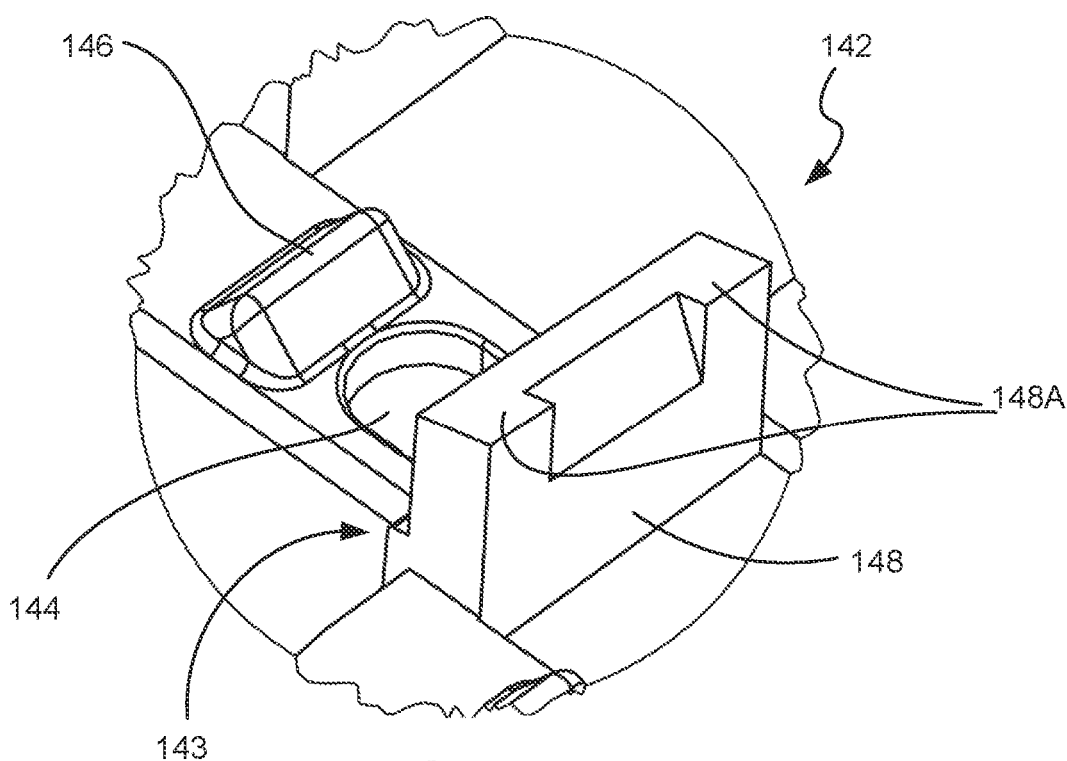
FIG. 12B is a close-up top view of a portion of the damper overlay of FIG. 12A that covers an axle support of the key support plate of FIG. 2A.

Referring to FIGS. 7A-7D, as with the hexagonal keys 102, the axle supports 114 are arranged in a hexagonal lattice, which may be understood to correspond to the arrangement of the hexagonal keys 102 in the hexagonal lattice arrangement 300 of FIG. 3A. Any given axle support 114, as shown for example with the axle support 114A, is molded directly into the key support plate 112 by its base. The axle support 114A includes two arms 116A and 116B which protrude or project upward from the key support plate 112. Each arm 116A, 116B, includes a through-hole 118A, 118B, which cooperate to support an axle for a hexagonal key 102 by which the hexagonal key 102 is pivotally supported by the axle support 114A. Where the key support plate 112 and the axle supports 114 thereof are formed by injection molding in a single mold, the through-holes 118A, 118B may be formed by shut-off surfaces. Each arm, 116A, 116B, further includes a retaining protrusion 119A, 199B, respectively, to retain a portion of a damper overlay 140, as discussed below (FIGS. 12A-12B).

The key support plate 112 further includes holes or access ports 120 through which a flexible printed circuit board of a hexagonal key 102 attached to the key support plate 112 may connect through to an input-output board 154 beneath the key support plate 112, as discussed in greater detail below.

The key support further includes holes or access ports 121 through which a magnet of a hexagonal key 102 may make contact with a sensor on an input-output board beneath the key support plate 112, as discussed in greater detail below.

Figure 8A:
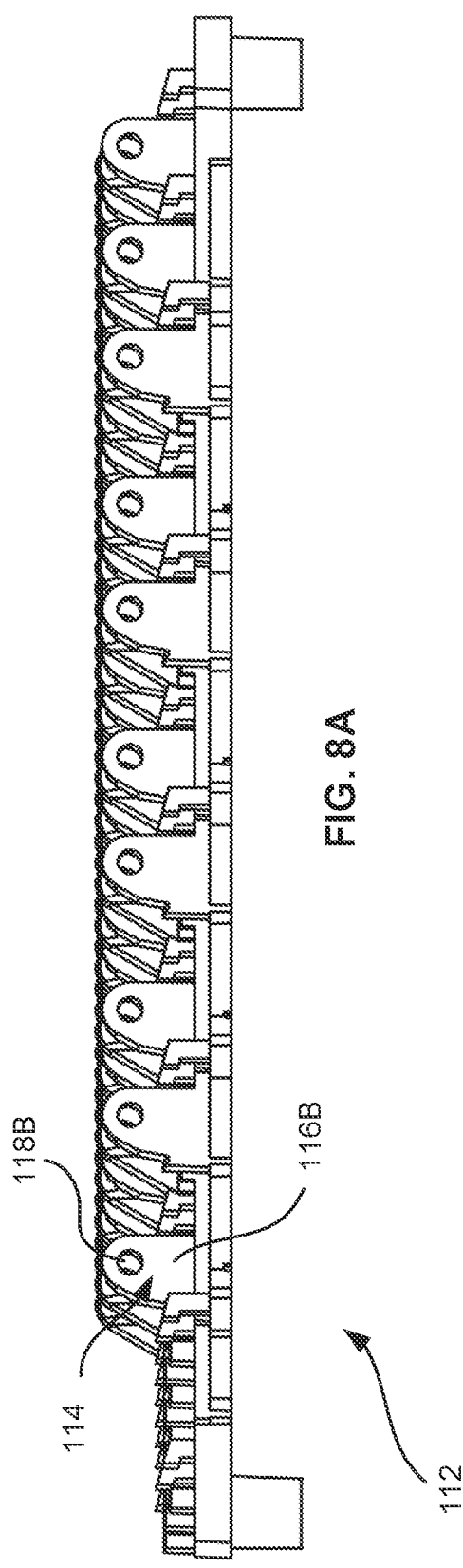
FIG. 8A is a side view of the key support plate of FIG. 2A as viewed from side A1 as shown in FIG. 7A.
Figure 8B:
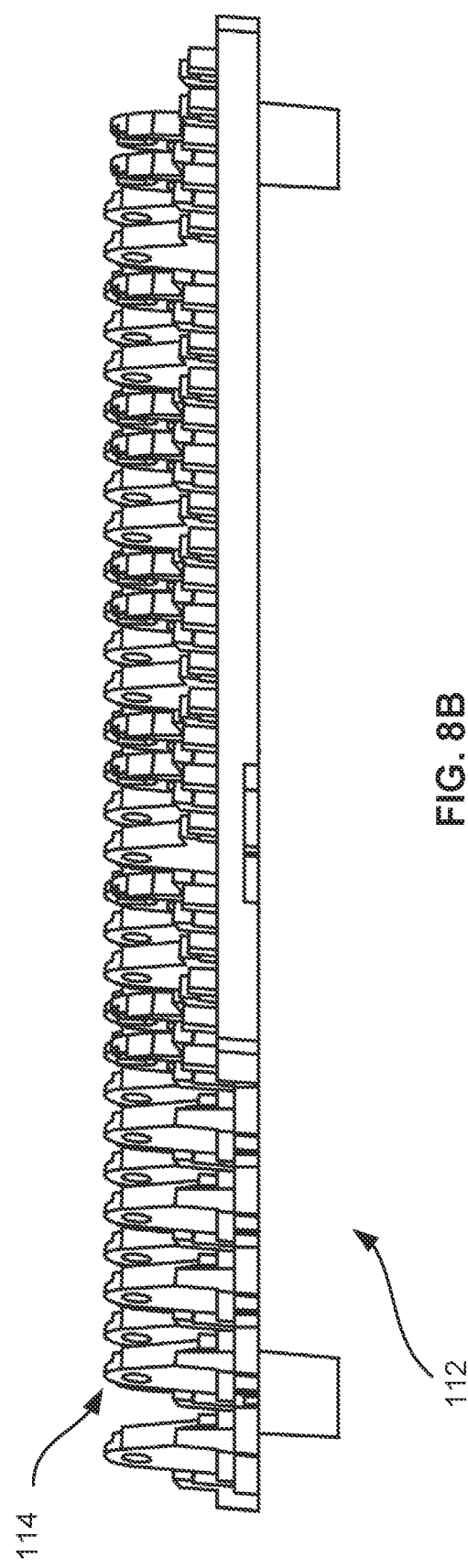
FIG. 8B is another side view of the key support plate of FIG. 2A as viewed from side A2 as shown in FIG. 7A.

FIG. 8A is a side view of the key support plate 112 as viewed from side A1 as shown in FIG. 7A. FIG. 8B is another side view of the key support plate 112 as viewed from side A2 as shown in FIG. 7A.

Figure 9A:
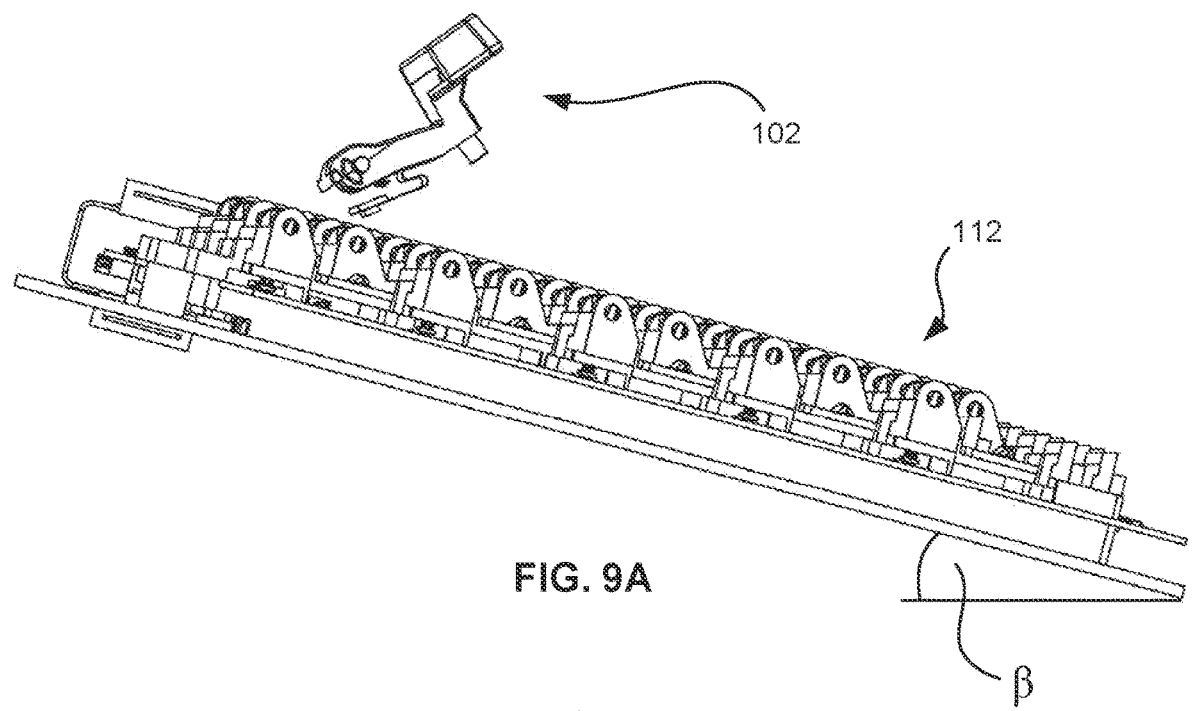
FIG. 9A is a side view of the frame of FIG. 2A showing an example hexagonal key being attached to the frame.
Figure 9B:
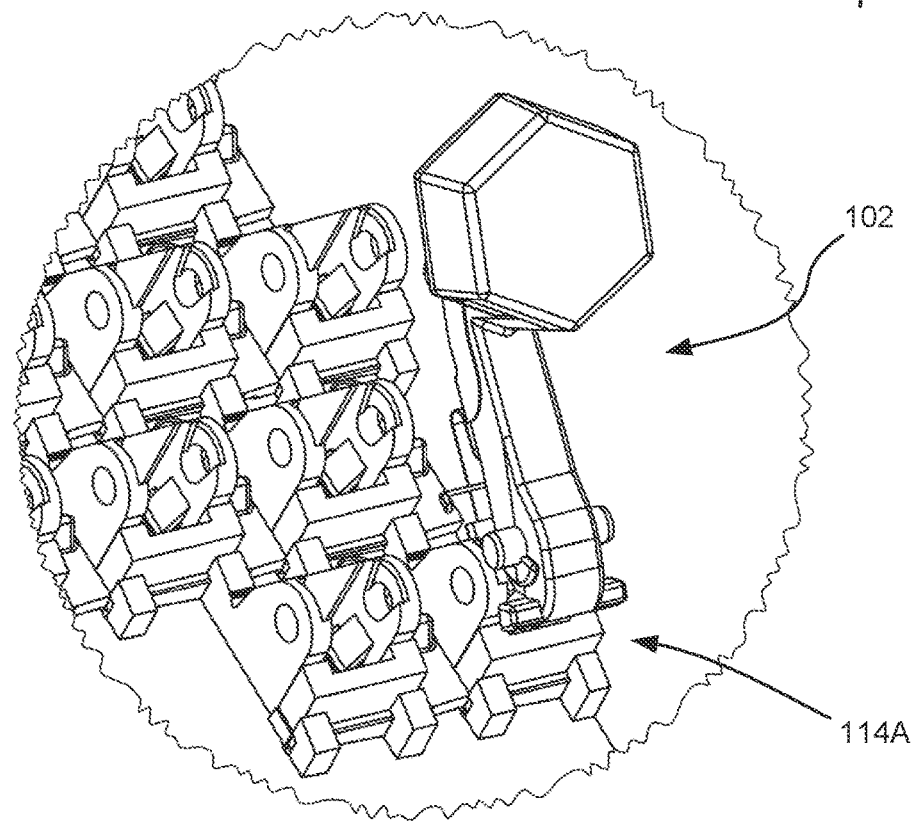
FIG. 9B is a close-up isometric view of the hexagonal key of FIG. 9A being attached to the frame.

FIGS. 9A and 9B show side views and close-up perspective views, respectively, of a hexagonal key 102 being attached to the key support plate 112 at a given axle support 114A. The key support plate 112 is shown inclined by the angle β from the horizontal reference. The key support plate 112 may be inclined by the angle β by a support such as a stand or by another structure of the frame 110 or hexagonal keyboard 100.

Figure 10:
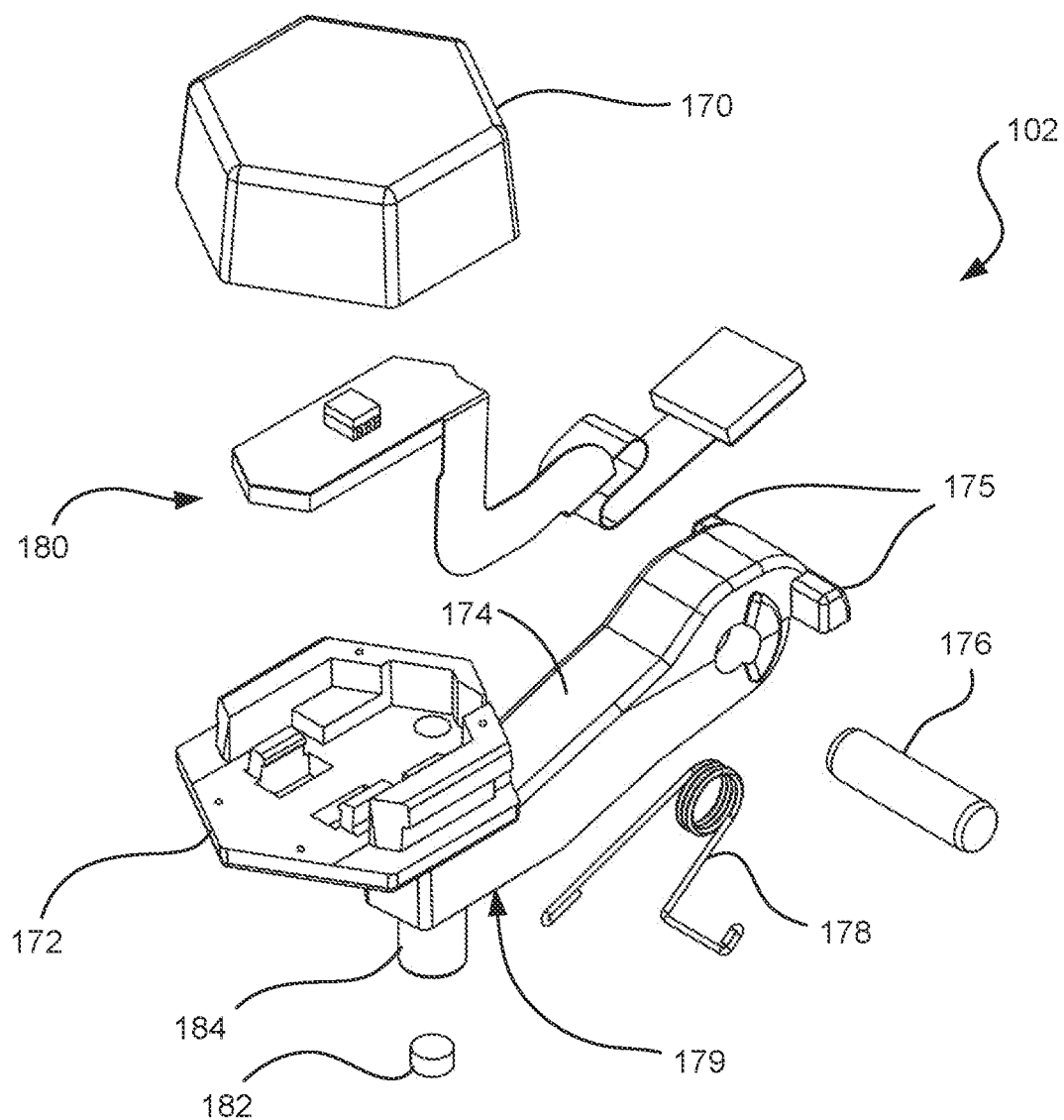
FIG. 10 is an exploded isometric view of an example hexagonal key of the hexagonal keyboard of FIG. 1.

FIG. 10 shows detail of the structure of a hexagonal key 102. A hexagonal key 102 includes a cap 170 that fits onto a head 172. The cap 170 may fit onto the head 172 via a slot mechanism, as shown. A flexible printed circuit board 180 is fitted onto the head 172 and adhered along the length of the arm 174, which connects to an input-output board 154 below the key support plate 112 (see FIG. 11A). The flexible printed circuit board 180 may include a light-emitting diode (LED) or other light source to illuminate the head 172. The cap 170 may be transparent, semi-transparent, or translucent, to allow light from the light source to emit through the cap 170.

The head 172 is supported by an arm 174 that is pivotally supported by a hinge. The hinge is formed by an axle 176 that fits through through-holes of an axle support 114 (e.g., see FIG. 9B). In some examples, trunnions protruding from the arm 174 may be used in place of the axle 176 to fit into the through-holes of an axle support 114. The arm 174 is designed to pivot about its hinge along a path of travel that is clear of neighboring hexagonal keys 102 and axle supports 114. This clear path is achieved by the hexagonal keys 102 being subject to the three rotations discussed in FIGS. 3A-5B.

A spring 178 biases the head 172 of the hexagonal key 102 upward in the unpressed state, and resists against being pressed by a user into the pressed state. The rear end of the hexagonal key 102 (the end of the hexagonal key 102 opposite the head 172 of the hexagonal key) is biased downward by the spring 178 until rear stops 175 at the rear end of the hexagonal key 102 are stopped by an upward stop (i.e., blocking portion) of a damper overlay, as discussed in greater detail below (i.e., upward stop 148 in FIG. 12B). The rear stops 175 and the upward stop of the damper overlay together determine the angle γ by which each hexagonal key 102 rests on its respective axle support 114.

A magnet 182 is fixed (e.g. adhered) to a hammer 184 beneath the arm 174. As the hexagonal key 102 is pressed, the magnet 182 passes through a hole or access port 121 in the key support plate 112 and approaches a sensor on the input-output board 154. The hexagonal keyboard 100 may be configured to detect a key press when the magnet 182 is sufficiently near the corresponding sensor on the input-output board, when a sufficient velocity of the magnet 182 is detected, or based on other criteria. Another blocking portion of the damper overlay beneath the key support plate 112 stops the downward motion of the hexagonal key 102 by impinging upon an area 179 of the arm 174 of the hexagonal key 102 (i.e., downward stop 146 in FIG. 12B).

Figure 11A:
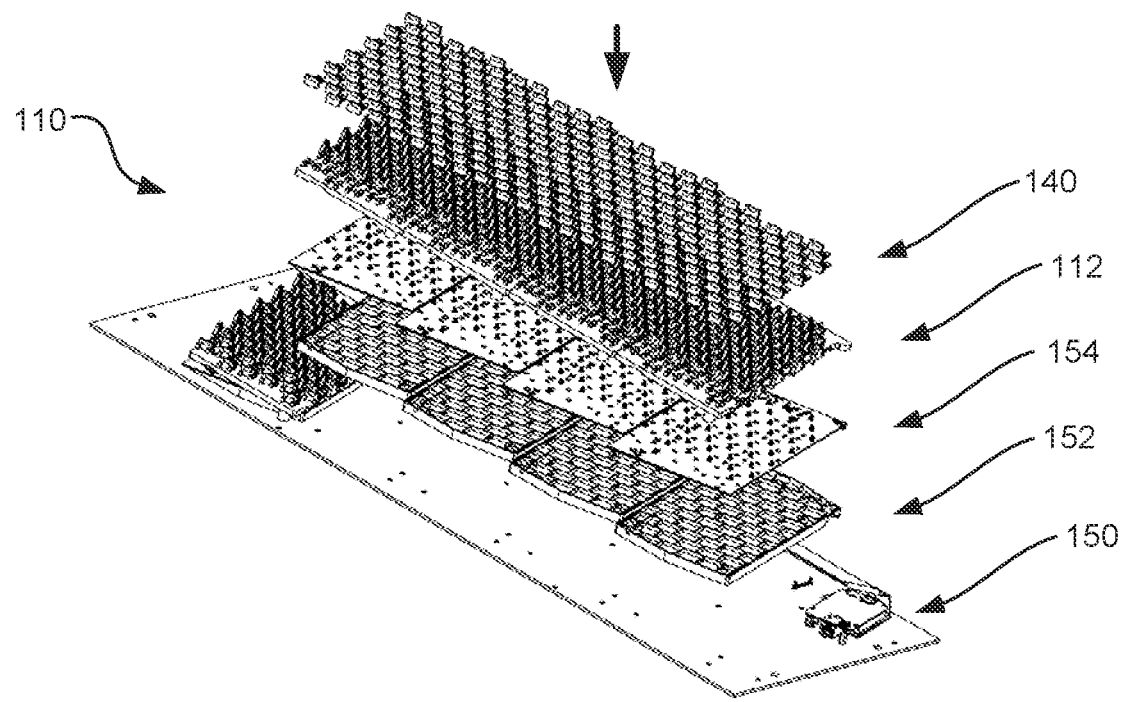
FIG. 11A is an exploded isometric view of example components of the hexagonal keyboard of FIG. 1 being assembled.
Figure 11B:
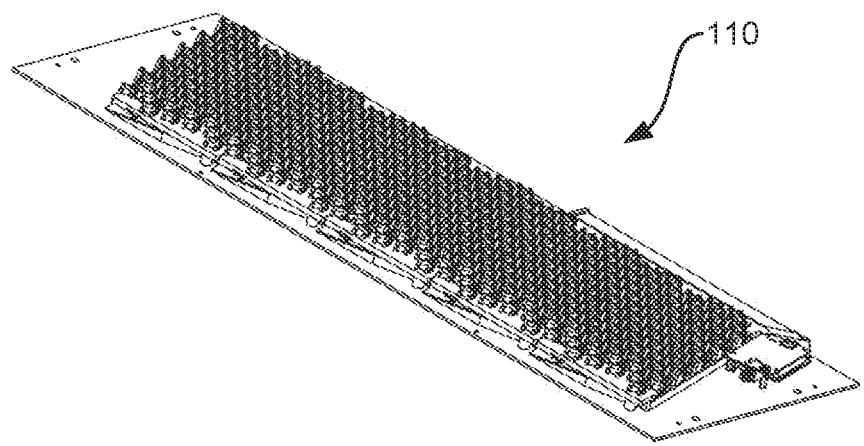
FIG. 11B is an isometric view of the components of FIG. 11A assembled.

The frame 110 includes additional functional structures and support structures that stack with the key support plate 112, as shown in FIGS. 11A-11B, in the assembly of the hexagonal keyboard 100. The frame 110 includes a base plate 150, on which one or more octave support plates 152 is to be stacked. An octave support plate 152 is designed to support a number of hexagonal keys 102 that corresponds to an "octave" of hexagonal keys 102. Thus, the hexagonal keyboard 100 may include a plurality of key support plates 112 that each support respective pluralities of hexagonal keys 102. Each of the respective pluralities of hexagonal keys 102 may combine to form part of a larger stepped hexagonal lattice. That is, the stepped hexagonal lattice may be contiguous between each octave of the hexagonal keyboard 100.

Onto each octave support plate 152 is stacked an input-output board 154, which supports input-output functionality for the hexagonal keys 102. For example, the input-output board 154 detects presses of hexagonal keys 102 and controls lights (e.g. LEDs) stored in the caps 170 of hexagonal keys 102.

Onto each input-output board 154 is stacked a key support plate 112, which supports the hexagonal keys 102 in the stepped lattice structure as discussed herein. Onto each key support plate 112 is stacked a damper overlay 140 to dampen the impacts caused when hexagonal keys 102 are pressed.

FIG. 12A is a top view of such an example damper overlay 140. The damper overlay 140 is shaped complementary to the key support plate 112. That is, the damper overlay 140 comprises a plurality of axle support sections 142 connected in a lattice structure that each corresponds to a respective axle support 114 in the key support plate 112 in which the axle supports 114 are connected in a hexagonal lattice. FIG. 12B is a close-up top view of a particular axle support section 142A of the damper overlay 140.

Each axle support section 142A is shaped to conform to certain surfaces of a corresponding axle support 114 on the key support plate 112. Each axle support section 142 of the damper overlay 140 includes features which interact with features of its corresponding axle support 114 or hexagonal key 102. Each axle support section 142 includes a retaining ledge 143, a hole or access port 144, a downward stop 146 (i.e., bumper), and an upward stop 148 (i.e., bumper).

The retaining ledge 143 is pinned down by the two retaining protrusions 119A, 119B, of a respective axle support 114 (see FIG. 7B, where it can be seen that each retaining protrusion 119A, 119B includes a lip which fits over the retaining ledge 143) to retain the damper overlay 140 against the key support plate 112.

The hole or access port 144 is aligned with the hole or access port 121 of the area of the key support plate 112 (FIG. 4C) beneath a respective axle support 114 to allow for passage of the magnet 182 of a respective hexagonal key 102 through the hole or access port 121.

The downward stop 146 contacts the area 179 of the arm 174 of a respective hexagonal key 102 (FIG. 7) when the hexagonal key 102 is pressed to resist downward motion of the hexagonal key 102. The downward stop 146 is compressible so that it may deform as the area 179 impinges upon it, thereby gradually increasing in resistance as the hexagonal key 102 is pressed further.

The upward stop 148 blocks movement of the rear stops 175 of a respective hexagonal key 102 (FIG. 10) to limit upward movement of the head 172 of the hexagonal key 102 which is caused by the spring 178 when the hexagonal key 102 is unpressed. Each rear stop 175 is blocked by a respective surface 148A of the upward stop 148. As discussed above, interaction between the rear stops 175 of the hexagonal keys 102 and the upward stops 148 of the damper overlay 140 determine the angle γ at which the hexagonal keys 102 rest on the axle supports 114.

Figure 13:
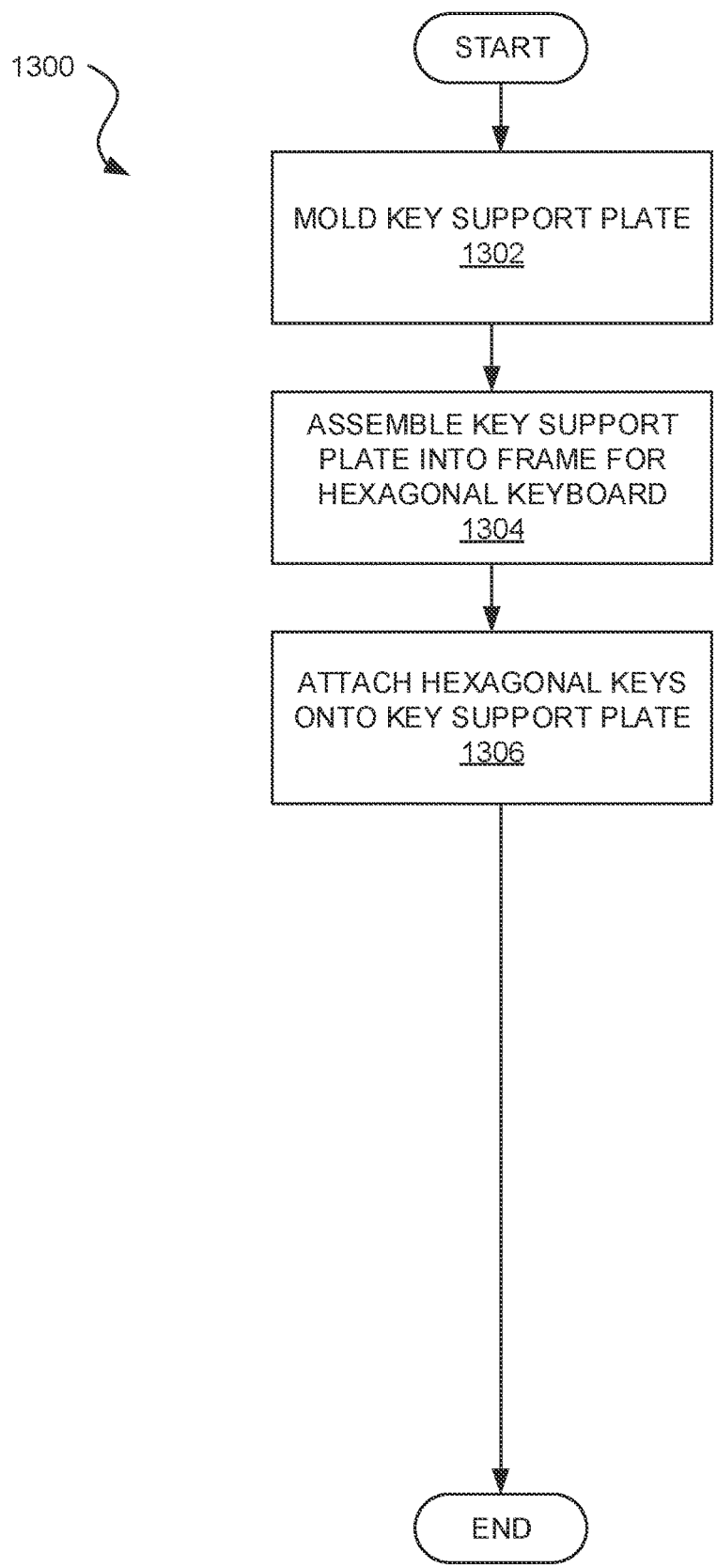
FIG. 13 is a flowchart of an example method for manufacturing a hexagonal keyboard.

FIG. 13 is a flowchart of an example method 1300 for manufacturing a hexagonal keyboard. For convenience, the method 1300 described with reference to the hexagonal keyboard 100, but this is not limiting, and the method 1300 may be applied to the manufacture of other hexagonal keyboards.

At block 1302, the key support plate 112 is molded. As discussed herein, the key support plate 112 is to support a plurality of hexagonal keys 102 on a plurality of axle supports 114. Thus, the molding of the key support plate 112 involves molding a plurality of axle supports 114 into the key support plate 112. Molding the key support plate 112 may involve injection molding the key support plate 112 and each axle support 114 thereof in a single mold.

Such injection molding may involve molding a first arm 116A and a second arm 116B that each protrude from the key support plate 112. The first arm 116A is molded to include a first through-hole 118A, and the second arm 116B is molded to include a second through-hole 118B aligned with the first through-hole 118A. The two through-holes 118A, 1186 are to support an axle 176 through the through-holes 118A, 118B to pivotally support a hexagonal key 102. The through-holes 118A, 1186 may be formed by shut-off surfaces in the injection molding process.

At block 1304, the key support plate 112 is assembled into the frame 110 for the hexagonal keyboard 100. As discussed herein, the frame 110 may include the base plate 150, one or more octave support plates 152, one or more input-output boards 154, and one or more damper overlays 140. For example, assembling the key support plate 112 may involve laying a damper overlay 140 over the key support plate 112. Further, assembling the key support plate 112 into the frame 110 may involve stacking these components as shown in FIG. 8A-8B. Thus, method 1000 may involve assembling the key support plate 112 adjacent to a further key support plate 112 to support a further plurality of hexagonal keys 102, each of the respective pluralities of hexagonal keys 102 combining to form part of a larger stepped hexagonal lattice.

At block 1306, a plurality of hexagonal keys 102 are attached to the key support plate 112. As discussed herein, each respective hexagonal key 102 attaches to a respective axle support 114 on the key support plate 112. As described herein, the hexagonal keys 102 are supported in the stepped hexagonal lattice arrangement as described herein, due to interactions between features of the hexagonal keys 102 (e.g. rear stops 175) with features of the damper overlay 140 (e.g. upward stop 148), inclination of the key support plate 112 from the horizontal reference, and rotation of the hexagonal keys 102 a bout the Z axis of the reference coordinate system 101. Thus, the method 1300 may further involve suspending the plurality of hexagonal keys 102 in a hexagonal lattice arrangement that is rotated by a first angle (α) with respect to a Z axis of the reference coordinate system 101, inclining the plurality of hexagonal keys 102 by a second angle (β) from a plane defined by the X and y axes of the reference coordinate system (i.e., the horizontal reference), and individually rotating each hexagonal key 102 by a third angle (γ) with respect to the Z axis of the reference coordinate system 101 in an opposite rotational direction from the first angle. The third angle may be made equal to the second angle so that each hexagonal key 102 is parallel with the plane defined by the X and y axes of the reference coordinate system 101.

The method 1300 need not be performed in the exact sequence as shown. For example, the hexagonal keys 102 may be attached to the key support plate 112 prior to assembly into the frame 110.

Thus, it can be seen that a hexagonal keyboard may be provided which is more simple and cost-effective to manufacture than existing hexagonal keyboards, and which allows movement of pivoting hexagonal keys without interference from neighboring hexagonal keys, and which reduces disruptions caused by the formation of holes among neighboring keys.

The features of the hexagonal keyboard described herein may be applied to any sort of hexagonal keyboard, including non-musical hexagonal keyboards, that is, hexagonal keyboards that may be used for typing with laptop and desktop computers. Further, the features described herein may be applied to any sort of keyboard that uses axle supports, including non-hexagonal keyboards in which keys are arranged in any shape and in any arrangement in which keys are supported by axle supports or trunnions.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A hexagonal keyboard comprising: a plurality of hexagonal keys; a frame including a key support plate to support the plurality of hexagonal keys; a plurality of axle supports molded into the key support plate, each respective axle support of the plurality of axle supports to pivotally support a respective hexagonal key about a respective hinge, wherein the hexagonal keys are supported in a stepped hexagonal lattice arrangement; wherein the key support plate and each respective axle support thereof is formed in a single mold by injection molding; and wherein each respective axle support comprises a first arm and a second arm that each protrude from the key support plate, the first arm including a first through-hole, the second arm including a second through-hole aligned with the first through-hole, the first and second arms to support an axle through the first and second through-holes by which a respective hexagonal key is pivotally supported by the respective axle support, wherein the first and second through-holes are formed in the first and second arms by shut-off surfaces.

2. The keyboard of claim 1, wherein each hexagonal key is supported in the stepped hexagonal lattice arrangement by:
the plurality of hexagonal keys being held in a hexagonal lattice arrangement that is rotated by a first angle with respect to a Z axis of a reference coordinate system;
the plurality of hexagonal keys being inclined by a second angle from a plane defined by the X and Y axes of the reference coordinate system; and
each hexagonal key being individually rotated by a third angle with respect to the Z axis of the reference coordinate system in an opposite rotational direction from the first angle.

3. The keyboard of claim 2, wherein the third angle is equal to the second angle so that each hexagonal key is parallel with the plane defined by the X and Y axes of the reference coordinate system.

4. The keyboard of claim 1, wherein each respective hexagonal key in the stepped hexagonal lattice comprises a respective arm that is to pivot about its respective hinge along a path of travel that is clear of neighboring hexagonal keys.

5. The keyboard of claim 1, further comprising a damper overlay that is shaped complementary to the key support plate to dampen impact caused when a hexagonal key is pressed.

6. The keyboard of claim 1, further comprising a plurality of key support plates to support respective pluralities of hexagonal keys, each of the respective pluralities of hexagonal keys to combine to form part of a larger stepped hexagonal lattice.

7. A key support plate to support a plurality hexagonal keys for a hexagonal keyboard, the key support plate comprising: a plurality of axle supports molded into the key support plate, each respective axle support of the plurality of axle supports to pivotally support a respective hexagonal key about a respective hinge; wherein the hexagonal keys are supported in a stepped hexagonal lattice arrangement; wherein the key support plate and each respective axle support thereof is formed in a single mold by injection molding; and wherein each respective axle support comprises a first arm and a second arm that each protrude from the key support plate, the first arm including a first through-hole, the second arm including a second through-hole aligned with the first through-hole, the first and second arms to support an axle through the first and second through-holes by which a respective hexagonal key is pivotally supported by the respective axle support, the first and second through-holes formed in the first and second arms by shut-off surfaces.

8. The key support plate of claim 7, wherein each hexagonal key is supported in the stepped hexagonal lattice arrangement by:
the plurality of hexagonal keys being held in a hexagonal lattice arrangement that is rotated by a first angle with respect to a Z axis of a reference coordinate system;
the plurality of hexagonal keys being inclined by a second angle from a plane defined by the X and Y axes of the reference coordinate system; and
each hexagonal key being individually rotated by a third angle with respect to the Z axis of the reference coordinate system in an opposite rotational direction from the first angle.

9. The key support plate of claim 8, wherein the third angle is equal to the second angle so that each hexagonal key is parallel with the plane defined by the X and Y axes of the reference coordinate system.

10. The key support plate of claim 7, wherein each respective hexagonal key in the stepped hexagonal lattice comprises a respective arm that is to pivot about its respective hinge along a path of travel that is clear of neighboring hexagonal keys.

11. A method for manufacturing a hexagonal keyboard, the method comprising: molding a key support plate, the key support plate to support a plurality of hexagonal keys, the molding of the key support plate comprising molding a plurality of axle supports into the key support plate; assembling the key support plate into a frame for the hexagonal keyboard; attaching a plurality of hexagonal keys onto the key support plate, each respective hexagonal key attaching to a respective axle support of the plurality of axle supports; wherein the hexagonal keys are supported in a stepped hexagonal lattice arrangement; wherein molding the key support plate comprises injection molding the key support plate and each respective axle support thereof in a single mold; and wherein injection molding the key support plate and each respective axle support thereof comprises molding a first arm and a second arm that each protrude from the key support plate, the first arm including a first through-hole, the second arm including a second through-hole aligned with the first through-hole, the first and second arms to support an axle through the first and second through-holes by which a respective hexagonal key is pivotally supported by the respective axle support, the first and second through-holes formed in the first and second arms by shut-off surfaces.

12. The method of claim 11, further comprising:
suspending the plurality of hexagonal keys in a hexagonal lattice arrangement that is rotated by a first angle with respect to a Z axis of a reference coordinate system;
inclining the plurality of hexagonal keys by a second angle from a plane defined by the X and Y axes of the reference coordinate system; and
individually rotating each hexagonal key by a third angle with respect to the Z axis of the reference coordinate system in an opposite rotational direction from the first angle.

13. The method of claim 12, wherein the third angle is equal to the second angle so that each hexagonal key is parallel with the plane defined by the X and Y axes of the reference coordinate system.

14. The method of claim 11, wherein assembling the key support plate into the frame comprises laying a damper overlay over the key support plate, the damper overlay shaped complementary to the key support plate to dampen an impact caused when a hexagonal key is pressed.

\* \* \* \* \*